Figure 1:
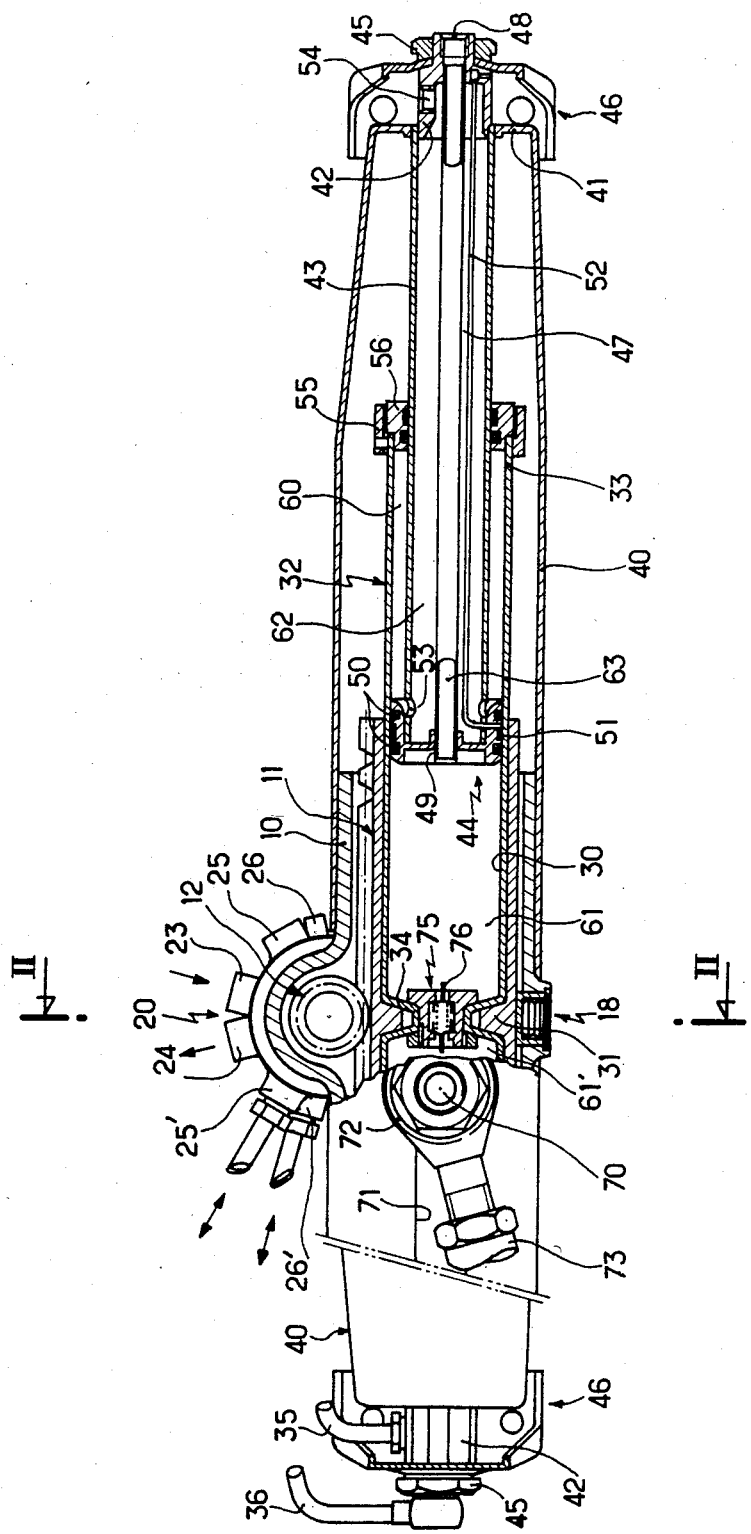

United States Patent [19]

Rosell

[11] Patent Number: 4,599,911

[45] Date of Patent: Jul. 15, 1986

[54] COMPACT ASSISTED STEERING MECHANISM FOR AN AUTOMOTIVE VEHICLE

[75] Inventor: Jorge E. Rosell, Barcelona, Spain

[73] Assignee: Bendiberica S.A., Barcelona,

[21] Appl. No.: 650,748

[22] Filed: Sep. 12, 1984

[51] Int. Cl.[4] .......................... B62D 3/12; B62D 5/10
[52] U.S. Cl. ................................. 74/388 PS; 74/422;
74/498; 91/437; 92/117 A; 92/86; 92/136;
180/148; 180/158
[58] Field of Search ...................... 74/89.17, 422, 498,
74/388 PS; 91/216 R, 437, 438, 439; 92/117 R,
117 A, 136, 86; 180/148, 158

[56] References Cited

U.S. PATENT DOCUMENTS

| | | | |
|---|---|---|---|
| 2,865,339 | 12/1958 | Bishop | 180/158 X |
| 2,955,667 | 10/1960 | Cota | 180/148 |
| 3,063,423 | 11/1962 | Riordan | 92/86 X |
| 3,347,109 | 10/1967 | Adams et al. | 74/388 |
| 3,566,751 | 3/1971 | Sheppard | 92/136 |
| 4,106,363 | 8/1978 | Buckingham | 74/498 |
| 4,141,432 | 2/1979 | Presley | 180/148 |
| 4,383,587 | 5/1983 | Lang | 180/158 X |

FOREIGN PATENT DOCUMENTS

| | | |
|---|---|---|
| 0077710 | 4/1983 | European Pat. Off. . |
| 0119923 | 9/1984 | European Pat. Off. . |
| 0119922 | 9/1984 | European Pat. Off. . |
| 1274434 | 9/1961 | France . |
| 2204168 | 5/1974 | France . |
| 2209899 | 7/1974 | France . |
| 2357413 | 2/1978 | France . |

*Primary Examiner*—Allan D. Herrmann
*Attorney, Agent, or Firm*—Larry J. Palguta; Ken C. Decker

[57] ABSTRACT

The mechanism incorporates at least one assistance unit consisting of a fixed piston (44) supported by a hollow rod (43) and of a cylinder (32) housed in a bore (30) of the rack (11), the chambers (60, 61) being supplied through separate passages (62, 63) extending through the hollow rod (43). The mechanism, advantageously of the type with central output and with a double circuit, incorporates a double circuit distribution valve mechanism (20) for supplying selectively the pairs of chambers (60, 61) on each side of the pinion (12) of the rack (11).

12 Claims, 2 Drawing Figures

COMPACT ASSISTED STEERING MECHANISM FOR AN AUTOMOTIVE VEHICLE

The present invention concerns steering mechanisms assisted by fluid pressure for motor vehicles and, more particularly, an assisted steering mechanism of the type incorporating a fixed steering casing in which is arranged a co-operating pinion and rack assembly, the pinion being intended to be joined to an input control component of the mechanism and the rack incorporating means for connection to linkages for the steerable wheels of the vehicle, an assistance unit employing fluid under pressure incorporating at least one fixed piston, firmly fixed to the casing by a rod, and a movable cylinder, joined to the rack, and defining first and second pressure chambers on each side of the piston, and a distribution valve means which may be activated by the input control component so as to supply the said first and second chambers selectively with fluid under pressure.

A mechanism of this type is described in French Patent Application No. FR-A-2,357,413 and incorporates, so as to avoid problems of excessive axial length of mechanisms with a movable piston at the end of the rack such as described, for example, in the document U.S. Pat. No. 3,347,109, a co-operating piston/cylinder assistance assembly arranged parallel to the fixed steering casing, and outside the latter. However, this arrangement has the disadvantages of increasing the transverse dimensions of the mechanism, of increasing the weight of the latter, of increasing the number of sliding zones to be protected and causes problems of alignment necessitating particularly elastic coupling devices between the piston/cylinder assistance assembly and the rack.

One object of the present invention is to propose an assisted steering mechanism of the type defined above, largely overcoming the disadvantages mentioned above, having a compact configuration axially and transversely at the same time, of simple and robust design and offering a wide variety of potential applications.

To achieve this, according to a feature of the invention, the cylinder is attached coaxially to a cylindrical body portion of the rack, in the extension of the latter, and incorporates on at least one of its ends a sealing ring co-operating in sealed sliding with the rod of the fixed piston, thus defining the first (annular) chamber of one side of the piston, the second chamber being defined, on the other side of the piston, by an end portion with bottom of the cylinder.

According to another feature of the invention, the end portion with bottom of the cylinder is housed in the cylindrical body portion of the rack, the rod extending in the opposite direction to the rack.

With such an arrangement, at least one of the chambers, having a large effective surface area, can be integrated in the rack. In addition, this arrangement allows the construction of a compact assisted steering mechanism with twin circuits, piloted by a suitable distribution valve means, with all the inherent advantages of this type of assisted steering mechanism.

In accordance therewith, according to a feature of the invention, the mechanism incorporates a distribution valve means with twin circuits and a pair of said assistance units employing fluid under pressure on each side of the rack.

Figure 2:
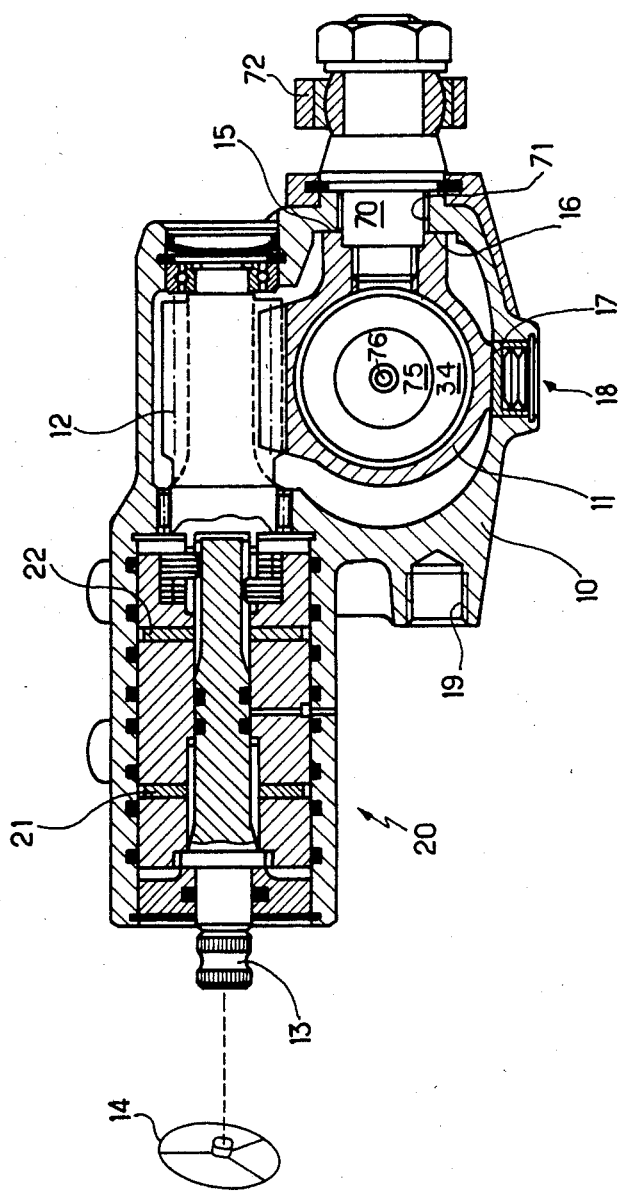

Other features and advantages of the present invention will emerge from the following description of an embodiment, given by way of illustration but not limiting in any way, with reference to the accompanying drawings, in which:

FIG. 1 is a view, partially in longitudinal section, of an assisted steering mechanism with twin circuits according to the invention; and FIG. 2 is a view in transverse section through the section plane II—II shown in FIG. 1.

FIGS. 1 and 2 show an assisted steering mechanism with central output according to the invention, incorporating a steering casing 10, advantageously made by casting, in which is mounted so as to slide a rack body 11, also possibly made by casting, co-operating with a pinion 12 pivoting in the casing 10 and activated via a rotary distribution valve 20, also advantageously mounted in a cylindrical extension of the casing 10, by an input component 13 intended to be joined to a steering wheel 14 of the motor vehicle.

As is shown clearly in FIG. 2, the rack body 11 is tubular but incorporates a first external projecting portion defining a flat sliding surface 15 intended to bear against a corresponding bearing surface 16 formed internally on a wall of the casing 10, and a second external projecting portion defining a flat sliding surface 17, opposite the teeth of the rack which mesh with the pinion 12, intended to co-operate with an elastic reaction device 18 mounted in the casing 10. The casing 10 incorporates means, such as 19, for fixing firmly to the chassis of the motor vehicle.

As is shown clearly in FIG. 1, the tubular rack body 11 is shaped internally with a longitudinal bore 30 centrally interrupted by a ring projecting radially inwards 31 thus separating the bore 30 into two symmetrical portions. In each portion of the bore 30 is housed a cylinder 32 extending axially beyond the rack body 11 and terminating at an open end 33, the portion of the cylinder which is housed in the bore 30 incorporating a bottom portion 34 bearing against the annular bulkhead 31, the bottom portions 34 of the two cylinders 32 housed on each side in the bore portions 30 being advantageously firmly fixed to one another, for example by welding.

Attached to the casing 10, on each side of the pinion 12, is a housing 40 incorporating an end collar folded inwards 41 in which is fixed, by means of a connector 42, a tube 43 lying centrally inside the cylinder 32, a piston structure 44 being fixed to the opposite end of the tube 43 from the connector 42. The connector 42 is joined, for example by a bolt 45, to a mounting 46 also intended to be fixed to the chassis of the vehicle. A tube of smaller diameter 47 is fixed inside the tube 43, passing through the connector 42 and communicating, inside the latter, with a connection opening 48, as will be seen below, the opposite (inner) end of the tubing 47 passing through the piston means 44 and advantageously being blocked at its end while being provided with an opening 49 which opens outwards, beyond the piston 44. This piston 44 incorporates two sliding seals 50 cooperating with the inner wall of the cylinder 32, spaced axially from one another; an annular groove 51 is arranged in the piston between these seals 50 which communicates with the outside, via the connector, by means of a narrow drain tube 52 extending through the tube 43 as far as the connector 42. The drain tube 52 connects groove 51 with atmosphere so that each seal 50 is subjected on only one side to high fluid pressure, even in the case where one seal is defective. Additionally, because seals 50 are concealed within housing 40, leakage resulting from the failure of a seal will be apparent at the outlet of the drain. The tube 43 incorporates an opening 53 which opens outwards just in front of the piston 44, the connector 42 incorporating a connection opening 54 which communicates with the interior of the tube 43.

Mounted on the outer end of the cylinder 32, by means of a threaded ring 55, is a sliding seal structure 56 co-operating in sealed sliding with the outer surface of the tube 43, thus separating the adjacent internal annular zone of the cylinder 32 from the interior of the housing 40.

In this way it is seen that, at least on one side of the rack, and advantageously on each side of the latter, the fixed piston 44 and its fixed rod 43 define, in the cylinder 32, a first chamber or primary annular chamber 60 on the opposite side of the piston from the rack, this annular chamber 60 being bounded externally by the sliding seal component 56 carried by the outer end of the cylinder 32, and a second chamber or secondary central chamber 61 on the side of the piston facing towards the pinion 12 and bounded internally by the bottom 34 of the cylinder 32 (this bottom 34 being able, as a variant, to be attached to the center of the bore 30). The primary annular chamber 60 is supplied with control fluid under pressure coming from one of the distribution openings of the distribution valve 20 by connecting a conduit, such as 35, between this distribution opening and the connection opening 54, the chamber 60 thus being able to be supplied with fluid under pressure through the internal passage 62 formed in the tube 43 between the openings 54 and 53. In a similar way, the inner or secondary chamber 61 can be joined to another distribution opening of the valve 20 by connecting, between this distribution opening of the valve and the connection opening 48, tubing such as 36 so as to convey in this way fluid under pressure into the secondary chamber 61 via the internal passage 63 formed by the tube of small diameter 47 between the openings 48 and 49.

In the embodiment shown, corresponding to an assisted steering mechanism with twin circuits, the distribution valve 20 incorporates a distribution assembly for the primary circuit 21, and coaxial with the latter, a distribution assembly for the secondary circuit 22. The valve 20 thus incorporates, in addition to the conventional openings for the admission 23 and the return 24 of fluid, a pair of distribution openings 25 and 26 for the primary 60 and secondary 61 chambers on one side of the rack, and a pair of equivalent distribution openings 25' and 26' for the primary and secondary chambers on the other side of the rack. In this way, according to the arrangement of the valve assemblies 21 and 22, each secondary chamber (in opposition to one another) can be used to add its effect to that of the opposite primary chamber in certain driving conditions, or to take the place (by selection) of the primary chamber, each circuit having different characteristics of pressure and/or flow. The distribution valve 20 consists, for example, of two valves in series with star type rotors and with springs in the shape of a C of the type described in Patent Application EU-A-0,077,710 in the name of the Applicant Company.

The assisted steering mechanism shown in FIGS. 1 and 2 is of the said type with central output, and as shown clearly in FIG. 2, the projecting portion forming the sliding surface 15 of the rack body 11 is joined to a pair of shaft components 70 passing through, so as to slide, a rectangular window 71 formed in the wall of the casing 10 defining the bearing surface 16, each shaft component 70 incorporating an articulated connection 72 for connecting to a link 73 for actuating the steerable wheels of the vehicle (not shown). In the embodiment shown in FIG. 1, a twin system of bypass valves (in opposition) 75 is arranged between the two inner chambers 61 and 61' by being mounted in the bottoms 34 of the cylinders 32, each valve, normally closed, incorporating a rod 76 projecting into the corresponding inner chamber 61 and capable of coming into contact, at the end of the travel in one direction of the assisted steering mechanism, against the closed bottom of the tube 47 so as to destroy the pressure differential between the opposite chambers of the corresponding circuit and thus to form a hydraulic safety stop for the mechanism.

Although the present invention is described above relating to a particular embodiment, the invention is not limited by it but, on the contrary, is capable of modifications and variants which will be apparent to a person versed in the art.

I claim:

1. A compact power steering mechanism for a vehicle, comprising:
   a stationary casing;
   a rack body reciprocable within said casing and having teeth in meshing engagement with a pinion gear actuatable by an input shaft member;
   a fluid pressure power unit including at least one stationary piston and a movable cylinder delimitating first and second pressure chambers on opposite sides of said stationary piston; and
   distribution valve means operable by said input shaft member to supply selectively said first and second pressure chambers with fluid pressure;
   further comprising at least one housing mounted on said casing and having one distal end wall, said stationary piston secured to one end of a piston rod having a peripheral surface, the piston rod extending within said housing and secured by another end to the distal end wall of said housing, said movable cylinder mounted within a cylindrical portion of said rack body and extending in prolongation thereof and coaxial with said piston rod, said movable cylinder supporting at an outer end a seal ring cooperating in sliding sealing engagement with said peripheral surface of said piston rod and delimitating said first pressure chamber on one side of said stationary piston, said second pressure chamber delimitated on another side of said stationary piston by an inner end wall portion of said movable cylinder.

2. The mechanism of claim 1, wherein said rack body has output connecting means for connection to steerable wheels.

3. The mechanism of claim 2, wherein said output connecting means extend through an elongated aperture formed in a lateral wall of said casing.

4. The mechanism of claim 3, wherein said rack body bears in sliding engagement against a complementary internal surface formed in said casing.

5. The mechanism of claim 4, wherein said complementary internal surface is formed by said lateral wall of said casing formed with said elongated aperture.

6. The mechanism of claim 1, wherein said piston rod is hollow and encloses separate fluid flow passages communicating, respectively, with said first and second pressure chambers.

7. The mechanism of claim 6, further comprising a pair of said fluid pressure power units on opposite sides of said stationary casing.

8. A compact power steering mechanism for a vehicle, comprising:
- a fixed steering casing housing a rack and pinion assembly, the pinion connected to an input component and the rack including connection means for connecting to wheel linkages;
- a fluid pressure power unit including at least one piston fixed to the casing by means of a piston rod and a movable cylinder joined to the rack and defining first and second pressure chambers on each side of the piston; and
- distribution valve means activated by the input component to supply selectively said first and second chambers with fluid pressure;
- characterized in that the movable cylinder is attached coaxially to a cylindrical body portion of the rack and prolongates the body portion, the movable cylinder including at an end a sealing ring cooperating in sliding and sealing engagement with the piston rod to define the first chamber on one side of the piston, the second chamber being defined on another side of the piston by a bottom end portion of the movable cylinder, the bottom end portion housed within the cylindrical body portion of the rack and the piston rod extending away from the rack, the distribution valve means having twin circuits, the mechanism further comprising a pair of the fluid pressure power units disposed one on each side of the rack, and the second chambers of the pair of fluid pressure power units capable of communicating mutually via a twin system of bypass valves situated in the bottom end portions of the movable cylinders.

9. The power steering mechanism according to claim 8, wherein the bypass valves are each capable of being activated selectively at an extremity of rack travel by abutment against a respective piston.

10. The power steering mechanism according to claim 8, wherein the piston rod is hollow and encloses separate passages for supplying fluid pressure, respectively, to the first and second chambers.

11. The power steering mechanism according to claim 8, wherein the piston includes two sealing components spaced axially from one another, a drain conduit opening into an annular groove situated between the two sealing components.

12. The power steering mechanism according to claim 8, wherein the rack bears slidingly against a complementary internal surface formed by a wall of the casing, the connection means extending outwardly through a rectangular window formed in the wall of the casing.

* * * * *